(12) United States Patent
Bealkowski (10) Patent No.: US 9,245,113 B2
(45) Date of Patent: Jan. 26, 2016

(54) OUT OF BAND VITAL PRODUCT DATA COLLECTION

(75) Inventor: Richard Bealkowski, Redmond, WA (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 598 days.

(21) Appl. No.: 12/909,989

(22) Filed: Oct. 22, 2010

(65) Prior Publication Data

US 2012/0102580 A1 Apr. 26, 2012

(51) Int. Cl.
| G06F 21/06 | (2006.01) |
| G06F 21/55 | (2013.01) |
| G06F 21/86 | (2013.01) |
| G06F 21/88 | (2013.01) |
| G06F 21/87 | (2013.01) |
| G06F 21/57 | (2013.01) |
| H04L 12/24 | (2006.01) |

(52) U.S. Cl.
CPC .............. *G06F 21/55* (2013.01); *G06F 21/575* (2013.01); *G06F 21/86* (2013.01); *G06F 21/87* (2013.01); *G06F 21/88* (2013.01); *H04L 41/0866* (2013.01)

(58) Field of Classification Search
CPC .................. G06F 21/57; G06F 21/577; G06F 21/86–21/88; G06F 2221/2143
USPC .......................................... 726/34, 35; 380/30
See application file for complete search history.

(56) References Cited

U.S. PATENT DOCUMENTS

| 8,116,455 B1 * | 2/2012 | Sussland et al. | |
| 8,132,267 B2 * | 3/2012 | Gurumoorthy et al. | 726/34 |
| 2003/0188173 A1 * | 10/2003 | Zimmer | G06F 21/57 713/189 |
| 2004/0073806 A1 * | 4/2004 | Zimmer | 713/189 |
| 2006/0136765 A1 * | 6/2006 | Poisner et al. | 713/323 |
| 2007/0174075 A1 * | 7/2007 | Franke et al. | 705/1 |
| 2007/0240019 A1 * | 10/2007 | Brady et al. | 714/43 |
| 2007/0255966 A1 * | 11/2007 | Condorelli | G06F 21/87 713/194 |
| 2008/0216179 A1 * | 9/2008 | Hall | 726/34 |
| 2009/0049309 A1 * | 2/2009 | Brinker et al. | 713/189 |
| 2009/0132799 A1 | 5/2009 | Brumley et al. | |

(Continued)

FOREIGN PATENT DOCUMENTS

WO WO 2009091301 A1 * 7/2009 ............ G06F 21/06

OTHER PUBLICATIONS

J.D. Strunk et al. "Intrusion Detection, Diagnosis, and Recovery with Self-Securing Storage" (CMU-CS-02-140, Carnegie Mellon University, May 2002). (pp. 1-28).*

(Continued)

*Primary Examiner* — Joseph P Hirl
*Assistant Examiner* — Thomas Gyorfi
(74) *Attorney, Agent, or Firm* — Edward J. Lenart; Katherine S. Brown; Kennedy Lenart Spraggins LLP (57) ABSTRACT

A vital product data (VPD) system is connected to a network, allowing the VPD system to be accessed for inquiries about VPD. The VPD system includes a baseboard management controller (BMC), a VPD cache, a platform initialization system and a tamper detection switch. The BMC communicates with the tamper detection switch and sets a VPD flag to false when tampering is detected. Queries to the BMC through the network for VPD are then held pending and the VPD cache refreshed with a no-boot power on, using the platform initialization system to collect the new VPD capturing the nature of any modifications after tampering.

20 Claims, 7 Drawing Sheets

(56) References Cited

U.S. PATENT DOCUMENTS

2009/0327678 A1* 12/2009 Dutton et al. ............... 713/2
2010/0287624 A1* 11/2010 Lindqvist .................. 726/34

OTHER PUBLICATIONS

A.G. Pennington et al. "Storage-Based Intrusion Detection: Watching storage activity for suspicious behavior" Proceedings of the 12th USENIX Security Symposium, Washington DC, Aug. 2003. (pp. 1-15).*

G. Pruett et al. "BladeCenter systems management software" IBM Journal of Research & Development, vol. 49, No. 6, Nov. 2005 (pp. 963-975) http://citeseerx.ist.psu.edu/viewdoc/download?doi=10.1.1.91.5091&rep=rep1&type=pdf.*

T. Brey et al. "BladeCenter chassis management" IBM Journal of Research & Development, vol. 49, No. 6, Nov. 2005 (pp. 941-961) http://citeseerx.ist.psu.edu/viewdoc/download?doi=10.1.1.87.8078&rep=rep1&type=pdf.*

Klare, Matthew. "Just Your Size," Smallbusinesscomputing.com. Jul. 1, 2000. http://www.smallbusinesscomputing.com/testdrive/article.php/685991/Just-Your-Size.htm.

* cited by examiner

OUT OF BAND VITAL PRODUCT DATA COLLECTION

BACKGROUND

The present invention relates to out of band (OOB) access to a server, and more specifically, to vital product data (VPD) maintained by a baseboard management controller (BMC) for OOB access.

Out of Band (OOB) operation refers to accessing a server computer (or other platform) when the main part of the system is powered down. Typically OOB access is directed to a baseboard management controller (BMC).

One of the types of OOB queries made to a BMC is to obtain an inventory or description of the server and of any optional components. This server inventory information is often referred to as vital product data (VPD). Often the information the BMC reports is generated or supplemented by data provided by the server's power on initialization phase.

The configuration of a server can be changed by the customer. Examples of changes include the addition or removal of memory, CPUs, adapter cards, disk drives, mother board expansions (such as "sidecars"), and other similar devices. After such changes are made and before the server is powered on, an out of band query can be made to obtain the VPD from the BMC. When this happens, erroneous information can be reported.

There is a need, therefore, for accurate reporting of VPD even when the server has been reconfigured during power off.

SUMMARY

According to one embodiment of the present invention, a VPD system is connected to a network, allowing the VPD system to be accessed for inquiries about VPD. The VPD system includes a BMC, a VPD cache, a platform initialization system and a tamper detection switch. Generally, the BMC communicates with the tamper detection switch and sets a VPD flag to false when tampering is detected. Queries to the BMC through the network for VPD are then held pending and the VPD cache refreshed with a no-boot power on using the platform initialization system to collect the new VPD capturing the nature of any modifications after tampering. The new VPD are then stored on the VPD cache.

In another embodiment of the present invention, a method includes detecting a tamper-induced change to a configuration of a server and invalidating a vital product data cache in response thereto. Also, the method may include updating the vital product data cache after invalidating the vital product data cache. Updating may be out of band, without booting the server.

In another embodiment, the method also includes receiving a request for vital product data and, if the vital product data cache is invalidated, communicating a data pending message. The data pending message continues to be communicated until the vital product data cache is updated.

In another embodiment, the method includes reporting the updated vital product data cache.

In another embodiment, detecting the tamper-induced change includes detecting when a tamper detection switch is set, such as when a cover is opened on the server.

In another embodiment, the method includes determining if the server is on and setting a no-boot flag to true if the server is not on. Also, when the no-boot flag is true, the method may include updating the vital product data without booting the server. Also, the no-boot flag may be set to false when updating the vital product data is complete.

In another embodiment, invalidating the vital product data cache includes setting a vital product data flag to false. And, once the vital product data cache is updated, the vital product data flag is set to true.

In another embodiment, updating the vital product data cache includes at least partially powering on the server. Also, the method may update the vital product data cache in response to receiving a power off request.

Embodiments of the invention may also include systems, processes and computer program products configured to or capable of implementing the method steps described above.

Advantages of the embodiments of the invention described herein include avoidance of the BMC returning potentially stale VPD information due to configuration changes to the server while it is powered down, or otherwise unable to recognize hardware, software and other configuration changes. Instead, some embodiments of the invention initiate a process to gather and refresh the VPD information so that it is current and accurate.

DETAILED DESCRIPTION

Figure 1:
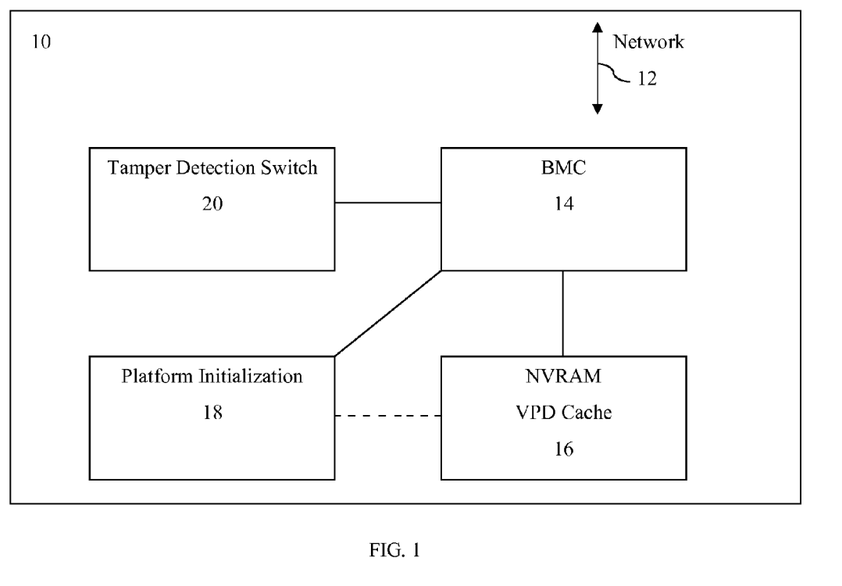
FIG. 1 is a schematic of a VPD system of one embodiment of the present invention.

With reference now to FIG. 1, embodiments of the present invention include a VPD system 10 connected to a network 12, allowing the VPD system to be accessed for inquiries about VPD. The VPD system 10 includes a BMC 14, a VPD cache 16, a platform initialization system 18 and a tamper detection switch 20. Generally, the BMC 14 communicates with the tamper detection switch 20 and sets a VPD flag to false when tampering is detected. Queries to the BMC 14 through the network 12 for VPD are then held pending and the VPD cache 16 refreshed with a no-boot power on using the platform initialization system 18 to collect the new VPD capturing the nature of any modifications after tampering. The new VPD are then stored on the VPD cache 16.

It should be noted that VPD also includes an indication of current configuration and, where applicable, any soft changes currently pending.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIG. 1, the tamper detection switch 20 provides a persistent indication of when the server has been, or may have been, modified. For example, in one embodiment, the tamper detection switch may be configured to trigger when the server case or lid is removed.

The BMC 14 is connected to the network 12 to receive and reply to OOB requests. The BMC is further connected to the VPD cache 16, such as non-volatile storage or NVRAM or other electronic storage, used to persistently store the VPD characterizing the configuration of the server, even after power-off of the server.

The platform initialization system 18 is configured to communicate with the BMC 14. The platform initialization system is also configured to access the VPD cache 16 directly, or via the BMC 14, or both, depending on the style of server implementation. For example, the platform initialization system 18 code can be one, or a combination of, power-on self test (POST), basic input-output system (BIOS), unified extensible firmware interface (UEFI), or open firmware.

Figure 2:
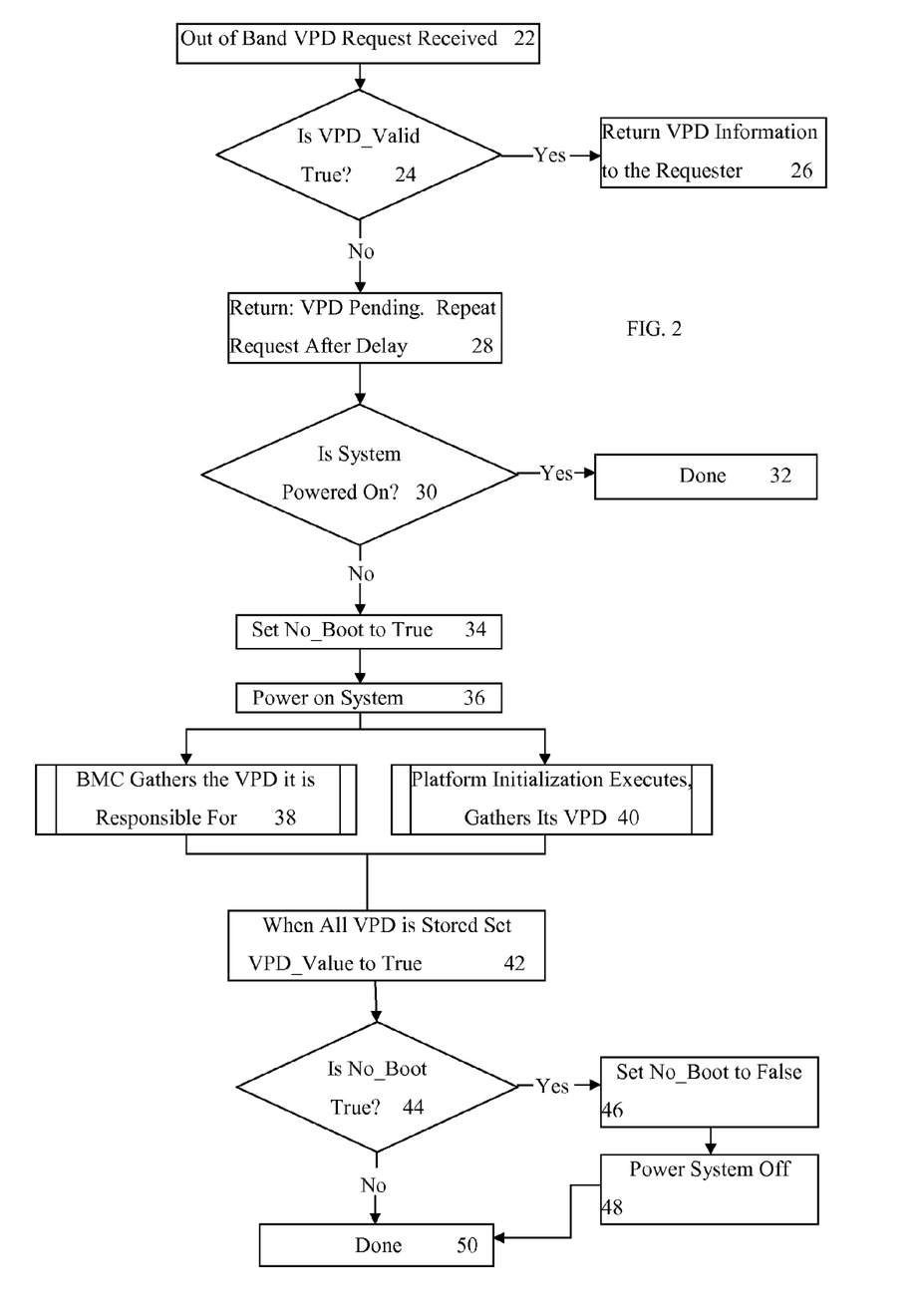
FIG. 2 is a flow diagram of a VPD refresh method or process of an embodiment of the present invention.

FIG. 2 is a flow diagram of another embodiment of the present invention including a method for determining the validity of the VPD cache and, when potentially invalid, initiating remedial action. The BMC 14 receives an OOB request for VPD 22. The BMC queries whether a VPD_validity flag is true 24. If the VPD is valid, then the VPD information is returned to the requestor 26. If the VPD is not valid, then the requestor is informed that the request is pending and to call back after an indicated delay 28.

The BMC queries whether the server is powered on 30. If the system is on, then the process is done 32. If the system is not on, then a No_Boot flag is set to true 34 and the system is powered on 36.

With the No_Boot flag set to true, platform initialization system 18 is configured to go through the discovery phases, executing and gathering its VPD 40, and then stopping prior to initiating a boot load. From one perspective, the "no boot" mode could be considered an initialization mode that is only for VPD gathering.

The BMC 14 also gathers its respective VPD information 38, and both the BMC and platform initialization system 18 store the VPD information and set the VPD_Valid flag or indicator to true 42. In one embodiment, the platform initialization system 18 does not store the information directly, rather it informs the BMC of the VPD data so that the BMC can incorporate it and store it. Regardless, once the VPD has been gathered the VPD_Valid flag is set to true 42.

Once VPD_Valid is true 42, the BMC 14 checks whether the No_Boot flag is true 44. The No_Boot flag being true indicates the process is only a VPD gathering session. Alternatively, the No_Boot could be set to false 46, for example, indicating a true power on event from an administrator (or other source) while the VPD was being gathered.

Referring again to FIG. 2, if No_Boot is true, then No_Boot is reset to false 46 and the server system is powered off 48 and the thread is done 50. Notably, at this point, the VPD is valid and can be sent for any subsequent VPD requests 22. If the No_Boot flag is set to false, for efficiency purposes, there is no reason to turn the server system off just to turn it back on again. Rather, the server system is simply allowed to proceed and the process thread is done 50.

Figure 3:
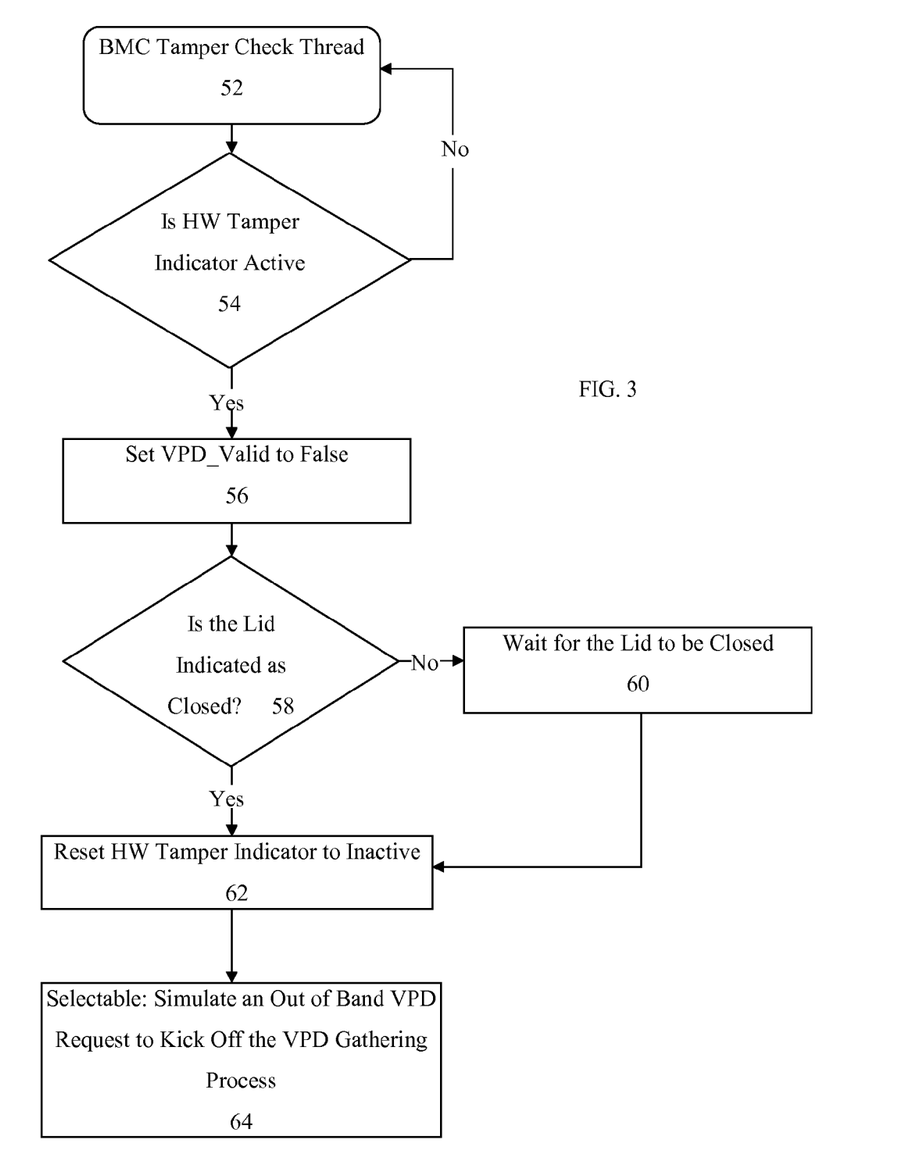
FIG. 3 is a flow diagram of a tamper detection method or process of another embodiment of the present invention.

Referring now to FIG. 3, an embodiment of the present invention includes a process or thread 52 for monitoring of the tamper detection switch 20. The tamper detection switch 20 indicates the current state of the switch, as well as a persistent indication of whether or not there has been a lid or cover event. The BMC query determines whether a tamper indicator is active 54. When the BMC detects a tamper event, the VPD cache 16 is invalidated by setting the VPD_Valid flag to false 56.

If the lid or cover has been replaced or closed 58, as indicated by the current position of the tamper detection switch 20, then the tamper indicator is reset to inactive 62. If the lid or cover is not in place, then the BMC waits for the lid to be closed 60 before resetting the tamper indicator to inactive 62. This is because an open case represents the potential for ongoing hardware changes.

Once the platform is stable (lid closed) and the tamper indicator is set to inactive 62, the BMC may automatically initiate a VPD refresh 64 that simulates an OOB VPD request, such as the process illustrated in FIG. 2. Notably, in one embodiment of the present invention, enabling and disabling the automatic VPD refresh 64 is a configuration option. For example, it might be advantageous to not perform the VPD refresh cycle in a manufacturing environment where specific external test processes might be in play.

Figure 4:
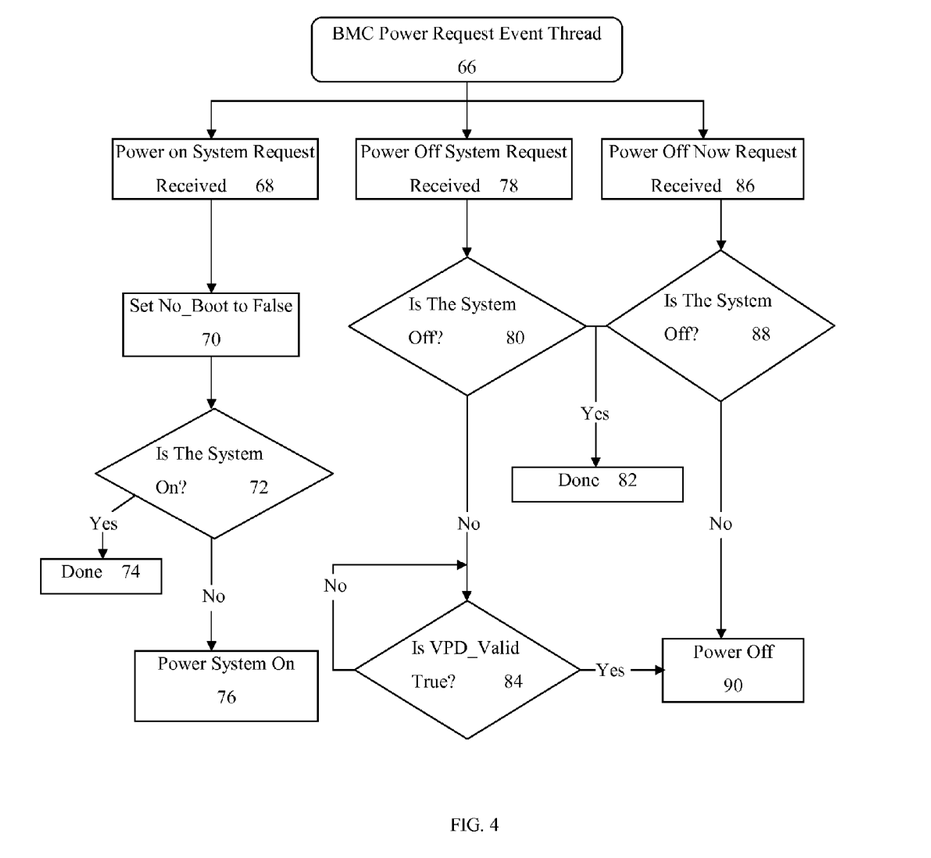
FIG. 4 is a flow diagram of a power on/off method or process of another embodiment of the present invention.

Referring now to FIG. 4, in another embodiment of the present invention the BMC 14 processes power on/off request events 66. If a power on is requested 68, then the No_Boot flag is set to false 70 to ensure the expected events of power on are performed. If the server system is already on 72, then no further action is required and the thread is done 74. If the system is off, then the system is powered on 76.

If a power off is requested 78, this is classified as a soft power off request with the intent that the server system finish any pending actions before turning off. The BMC 14 queries whether the system is off 80. If the system is currently on (i.e., query 80 answer is no), then the BMC 14 determines whether the VPD_valid flag is true 84. If the VPD_valid flag is not true, then the VPD update cycle is ongoing and allowed to complete.

If no VPD update cycle is occurring (the VPD_valid flag is true), then the system can be powered off 90 assuming no other blocking activities. If a power off now (hard power off) 86 is requested, then the BMC 14 queries whether the system is off 88. If the system is already off, the thread is done 82. If not already off, the system is immediately powered off 90, regardless of whether a VPD refresh is ongoing.

Figure 5:
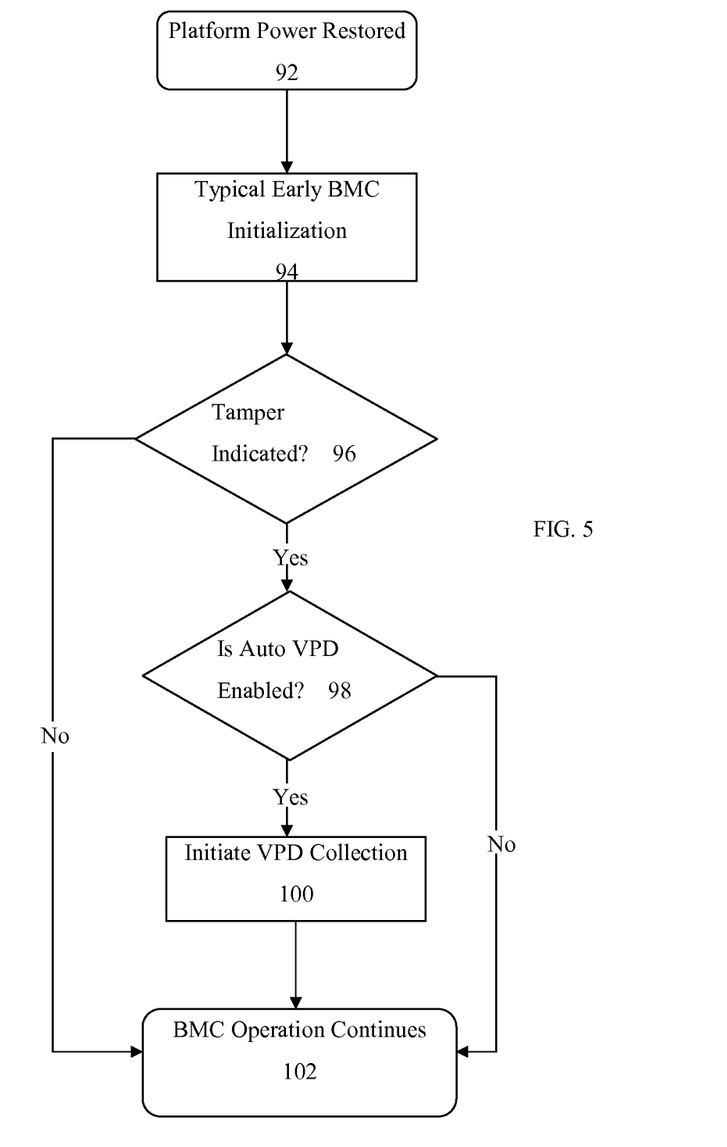
FIG. 5 is a flow diagram of a power-up process or method of another embodiment of the present invention.

Referring now to FIG. 5, an embodiment of the present invention includes a BMC power-up process. Once the power is applied 92 and the BMC performs its typical initialization 94, a check is made to determine if a tamper event has occurred 96. If no tamper event exists, then the BMC continues its operation 102.

If a tamper event is detected, then the BMC 14 checks to see if it is configured to automatically invoke the VPD refresh sequence 98. If not configured to automatically invoke the VPD refresh sequence, then the BMC 14 continues its operation 102. If the BMC 14 is configured for automatic VPD harvesting, then the BMC initiates the VPD collection process 100, such as the process illustrated in FIG. 2.

Figure 6:
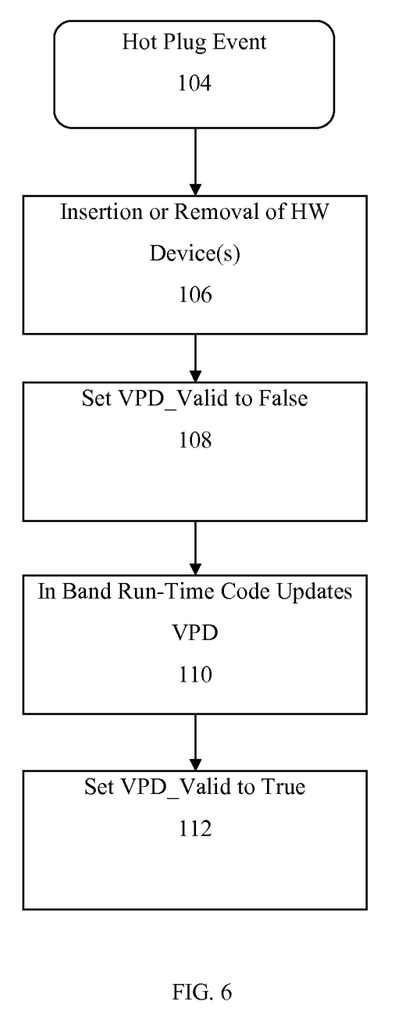
FIG. 6 is a flow diagram of a hot plug event process or method of another embodiment of the present invention.

Referring to FIG. 6, another embodiment of the present invention is a process for handling changes to the server by a hot plug event 104. A hot plug device is inserted or removed 106. The VPD_valid flag is set to false 108, indicating a change to the system not reflected in the VPD information. The VPD is updated 110 and the VPD_valid flag is set to true 112. Generally, the hot plug even process is performed by the operating system, or other control program such as a hypervisor, its drivers, and/or firmware such as ACPI (Advanced Configuration and Power Interface).

Figure 7:
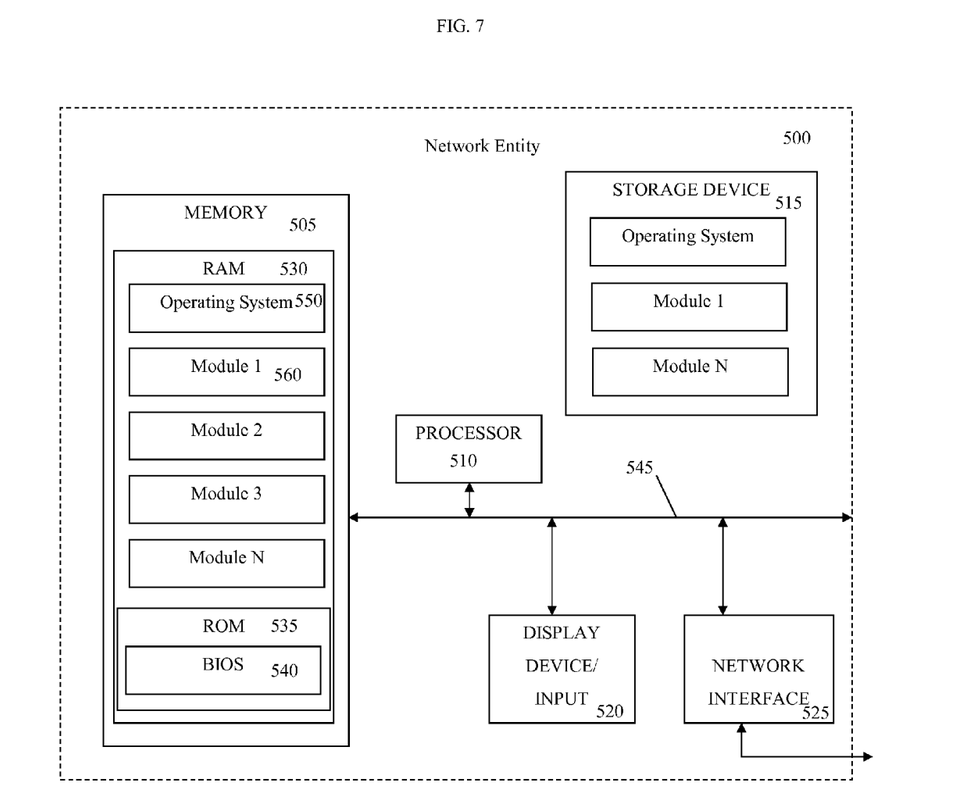
FIG. 7 is a schematic of a VPD system of another embodiment of the present invention.

Referring now to FIG. 7, a schematic diagram of a central server 500, or similar network entity, configured to implement a VPD system, according to one embodiment of the invention, is provided. As used herein, the designation "central" merely serves to describe the common functionality the server provides for multiple clients or other computing devices and does not require or infer any centralized positioning of the server relative to other computing devices. As may be understood from FIG. 7, in this embodiment, the central server 500 may include a processor 510 that communicates with other elements within the central server 500 via a system interface or bus 545. Also included in the central server 500 may be a display device/input device 520 for receiving and displaying data. This display device/input device 520 may be, for example, a keyboard or pointing device that is used in combination with a monitor. The central server 500 may further include memory 505, which may include both read only memory (ROM) 535 and random access memory (RAM) 530. The server's ROM 535 may be used to store a basic input/output system 540 (BIOS), containing the basic routines that help to transfer information across the one or more networks.

In addition, the central server 500 may include at least one storage device 515, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the art, each of these storage devices 515 may be connected to the system bus 545 by an appropriate interface. The storage devices 515 and their associated computer-readable media may provide nonvolatile storage for a central server. It is important to note that the computer-readable media described above could be replaced by any other type of computer-readable media known in the art. Such media include, for example, magnetic cassettes, flash memory cards and digital video disks.

A number of program modules may be stored by the various storage devices and within RAM 530. Such program modules may include an operating system 550 and a plurality of one or more (N) modules 560. The modules 560 may control certain aspects of the operation of the central server 500, with the assistance of the processor 510 and the operating system 550. For example, the modules may perform the functions described above and illustrated by the figures and other materials disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Advantages of the embodiments of the invention described herein include avoidance of the BMC returning potentially stale VPD information due to configuration changes to the server while it is powered down, or otherwise unable to recognize hardware, software and other configuration changes. Instead, some embodiments of the invention initiate a process to gather and refresh the VPD information so that it is current and accurate.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    detecting, by a baseboard management controller on a first server, a tamper-induced change to a physical configuration of the first server, wherein the baseboard management controller comprises a module of computer program instructions communicating with a second server;
    invalidating, by the baseboard management controller, a vital product data cache, wherein the vital product data cache comprises computer memory in the first server;
    updating, by the baseboard management controller, the vital product data cache to reflect changes to the physical configuration of the first server without booting the first server;
    receiving a power off request during the updating the vital product data cache; and
    allowing, by the baseboard management controller, the updating the vital product data cache to complete before powering off the first server.

2. A method of claim 1, further comprising receiving, from the second server by the baseboard management controller, a request for vital product data and, if the vital product data cache is invalidated, communicating, by the baseboard management controller, a data pending message.

3. A method of claim 2, further comprising continuing to communicate the data pending request is until updating the vital product data cache is completed.

4. A method of claim 3, further comprising reporting the updated vital product data cache.

5. A method of claim 3, wherein detecting the tamper-induced change includes detecting when a tamper detection switch is set.

6. A method of claim 5, wherein the tamper detection switch is set when a cover is opened on the first server.

7. A method of claim 5, further comprising determining, by the baseboard management controller, if the first server is on and setting a no-boot flag to true if the first server is not on.

8. A method of claim 7, wherein updating without booting the first server is in response to detecting the no-boot flag is true.

9. A method of claim 8, further comprising setting, by the baseboard management controller, the no-boot flag to false when updating the vital product data cache is complete.

10. A method of claim 7, wherein invalidating the vital product data cache includes setting a vital product data flag to false.

11. A method of claim 10, further comprising setting, by the baseboard management controller, the vital product data flag to true in response to updating the vital product data cache.

12. A method of claim 1, wherein updating the vital product data cache includes at least partially powering on the first server.

13. A computer program product comprising at least one computer-readable storage medium having computer-readable program code portions stored therein, the computer-readable program code portions comprising:
    a first executable portion configured to detect a tamper-induced change to physical a configuration of a first server;
    a second executable portion configured to invalidate a vital product data cache, wherein the vital product data cache comprises computer memory in the first server;
    a third executable portion configured to update the vital product data cache to reflect changes to the physical configuration of the first server without booting the first server; and
    a fourth executable portion configured to receive a power off request during the updating the vital product data cache; and
    a fifth executable portion configured to allow the updating the vital product data cache to complete before powering off the first server.

14. A computer program product of claim 13, further comprising a sixth executable portion configured to receive a request from the second server for vital product data and, if the vital product data cache is invalidated, communicate a data pending message.

15. A computer program product of claim 14, further comprising a seventh executable portion configured to continue communicating the data pending request is until updating the vital product data cache is completed.

17. A computer program product of claim 16, further comprising an ninth executable portion configured to determine if the first server is on, set a no-boot flag to true if the first server is not on and update without booting the first server in response to detecting the no-boot flag is true.

18. A computer program product of claim 17, further comprising a tenth executable portion configured to set the no-boot flag to false when updating the vital product data cache is complete.

19. A computer program product of claim 16, further comprising a eleventh executable portion configured to set a vital product data flag, indicating whether the vital product data is valid, to false.

20. A computer program product of claim 19, further comprising an twelfth executable portion configured to set the vital product data flag to true in response to updating the vital product data cache.

* * * * *